US012774885B2

(12) United States Patent
Tanaka et al.

(10) Patent No.: US 12,774,885 B2
(45) Date of Patent: Oct. 27, 2026

(54) INSPECTION DEVICE

(71) Applicant: Saki Corporation, Tokyo (JP)

(72) Inventors: Hideaki Tanaka, Tokyo (JP); Tatsuyuki Matsuura, Tokyo (JP)

(73) Assignee: SAKI CORPORATION, Tokyo (JP)

( * ) Notice: Subject to any disclaimer, the term of this patent is extended or adjusted under 35 U.S.C. 154(b) by 56 days.

(21) Appl. No.: 19/103,825

(22) PCT Filed: Jul. 20, 2023

(86) PCT No.: PCT/JP2023/026570

§ 371 (c)(1),
(2) Date: Feb. 14, 2025

(87) PCT Pub. No.: WO2024/042933

PCT Pub. Date: Feb. 29, 2024

(65) Prior Publication Data

US 2026/0049814 A1 Feb. 19, 2026

(30) Foreign Application Priority Data

Aug. 24, 2022 (JP) ................................ 2022-132893

(51) Int. Cl.
*G01B 11/25* (2006.01)
*G01B 11/06* (2006.01)
(Continued)

(52) U.S. Cl.
CPC ........ *G01B 11/254* (2013.01); *G01B 11/0608* (2013.01); *G01N 21/95684* (2013.01);
(Continued)

(58) Field of Classification Search
CPC ... G01B 11/254; G01B 11/0608; G01B 11/25; G01B 11/2513; G01N 2021/95638;
(Continued)

(56) References Cited

U.S. PATENT DOCUMENTS 8,705,018 B2 * 4/2014 Benderly ............... G01N 21/87 356/30
11,026,313 B1 * 6/2021 Ser ......................... G01N 21/01
2015/0036128 A1 2/2015 Chen et al.

FOREIGN PATENT DOCUMENTS

JP H02-167450 A 6/1990
JP H09-061363 A 3/1997
(Continued)

OTHER PUBLICATIONS

WO2014196010A1 English Translation (Year: 2014).*

*Primary Examiner* — Tarifur R Chowdhury
*Assistant Examiner* — Kaitlyn E Kidwell
(74) *Attorney, Agent, or Firm* — HAUPTMAN HAM, LLP

(57) ABSTRACT

An inspection device includes: a first image unit that captures an image of an inspection object from a vertical direction; a plurality of dome-shaped reflector plates being arranged between the first image unit and the inspection object and having aperture parts on a side of the first image unit and a side of the inspection object, respectively; a plurality of annular light sources that illuminate the respective reflector plates; and apparatuses for inspection (second image unit and projection unit) that are provided outside of the reflector plates and are capable of capturing an image of the inspection object 12 or irradiating the inspection object with light. Optical axes of the apparatuses for inspection are arranged so as to pass through through-holes provided in the reflector plates.

9 Claims, 5 Drawing Sheets

(51) Int. Cl.
*G01N 21/88* (2006.01)
*G01N 21/956* (2006.01)

(52) U.S. Cl.
CPC .................... *G01N 21/8806* (2013.01); *G01N 2021/95638* (2013.01); *G01N 2021/95653* (2013.01)

(58) Field of Classification Search
CPC ... G01N 2021/95653; G01N 21/95684; G01N 21/8806; G01N 21/956; G01N 2021/8841; G01N 2021/8812; G01N 2021/8816; G01N 2021/8819; G01N 2021/8809; G01N 21/8803; G01N 21/88; G01N 2201/0634; G01N 2201/063; G01N 2201/0636; G01N 2201/0637
See application file for complete search history.

(56) References Cited

FOREIGN PATENT DOCUMENTS

| | | | |
|---|---|---|---|
| JP | 2010-237034 | A | 10/2010 |
| JP | 2011-058821 | A | 3/2011 |
| JP | 2014-085220 | A | 5/2014 |
| JP | 2014-215067 | A | 11/2014 |
| JP | 2018-189450 | A | 11/2018 |
| WO | 2014196010 | A1 | 12/2014 |

* cited by examiner

[Figure 1]
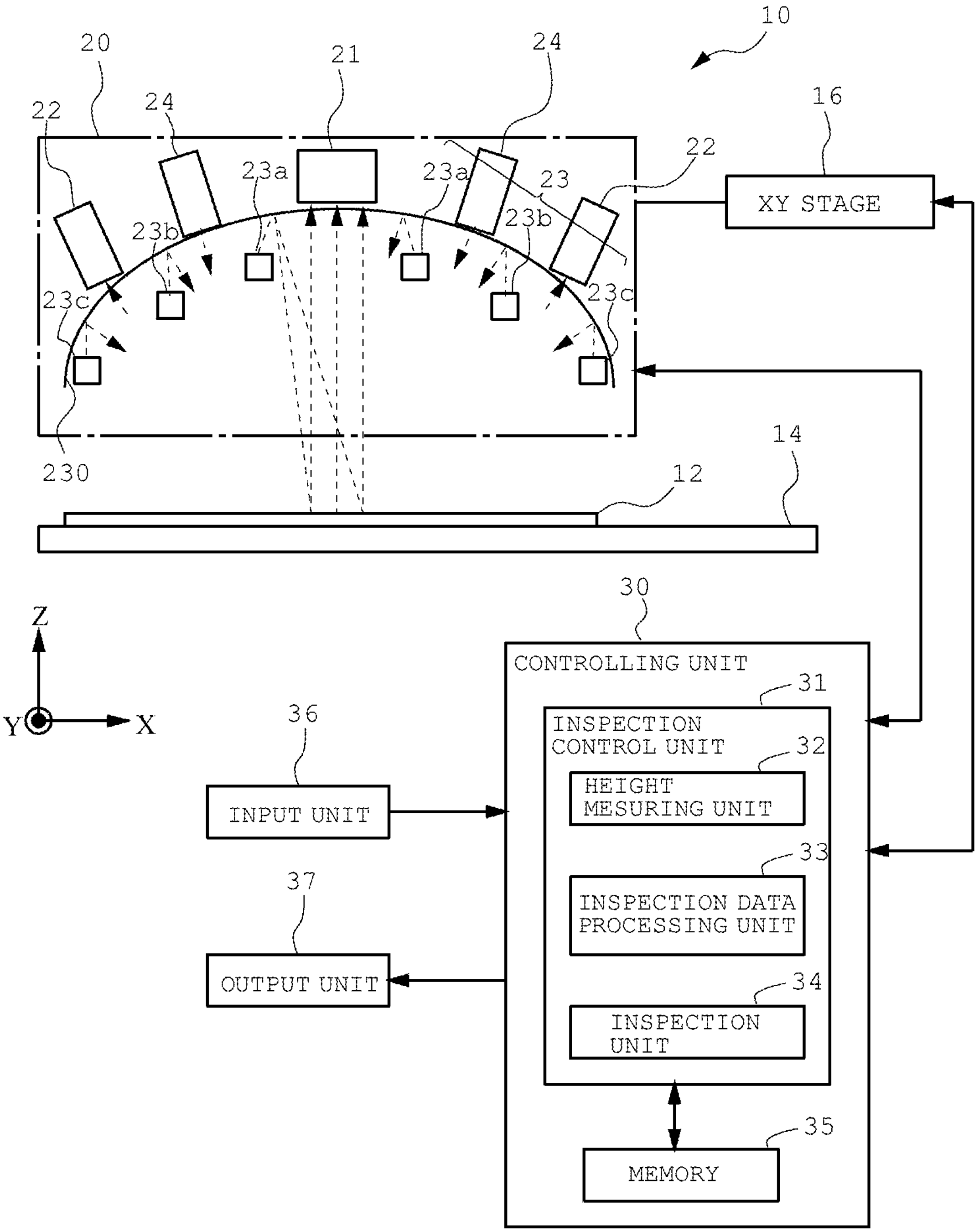

[Figure 3]
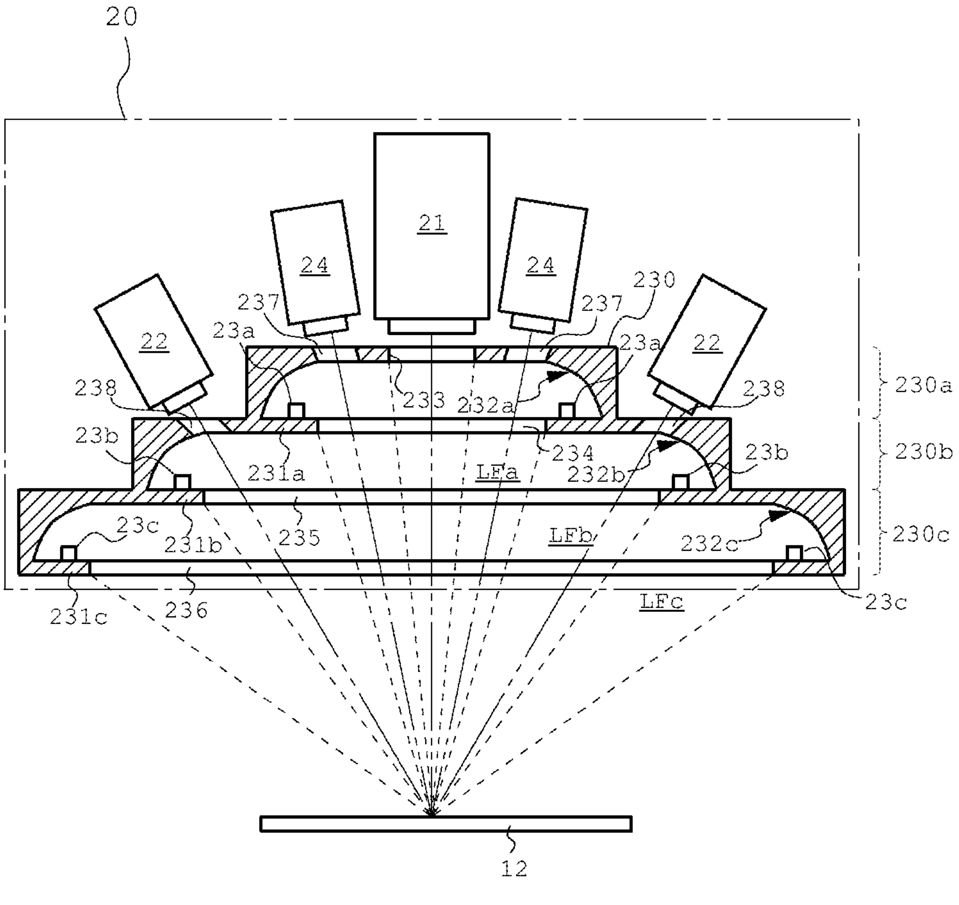

INSPECTION DEVICE

RELATED APPLICATIONS

The present application is a National Phase of International Application No. PCT/JP2023/026570, filed Jul. 20, 2023, and claims priority based on Japanese Patent Application No. 2022-132893, filed Aug. 24, 2022.

TECHNICAL FIELD

The present invention relates to an inspection device.

BACKGROUND ART

In an inspection device that captures an image of an inspection object such as a substrate on which electronic components or the like are mounted and inspects an appearance of the inspection object using captured image data, there is a configuration that, as a method of illuminating an inspection object being an imaging object, uses an illuminating unit including a dome-shaped reflector plate arranged so as to cover the imaging object from a vertical direction to irradiate the imaging object with illumination light by reflecting light from a light source with the reflector plate (for example, refer to Patent Literature 1).

CITATION LIST

Patent Literature

Patent Literature 1: Japanese Patent Laid-Open No. 2010-237034

SUMMARY OF INVENTION

Technical Problem

In the case of the configuration described above, while it is necessary to open a through-hole in the reflector plate of the illuminating unit to pass an optical path in order to install apparatuses for inspection such as an inclined image unit that captures images of the imaging object from a diagonal direction and a projection unit that projects pattern stripes onto the imaging object in addition to a main image unit that captures images of the imaging object from the vertical direction, there is a problem in that increasing a diameter of the through-hole creates an area where the imaging object is not irradiated with the illumination light (this area is referred to as a "dead spot") and causes measurement accuracy to decline.

The present invention has been made in consideration of such a problem and an object thereof is to provide an inspection device capable of reducing a dead spot of illumination light on an imaging object and improving measurement accuracy.

Solution to Problem

In order to solve the problem described above, an inspection device according to the present invention includes: a main image unit that captures an image of an imaging object from a vertical direction; a plurality of dome-shaped reflector plates being arranged between the main image unit and the imaging object and having aperture parts on a side of the main image unit and a side of the imaging object, respectively; a plurality of annular light sources that illuminate the respective reflector plates; and apparatuses for inspection that are provided outside of the reflector plates and are capable of capturing an image of the imaging object or irradiating the imaging object with light, wherein optical axes of the apparatuses for inspection are arranged so as to pass through through-holes provided in the reflector plates.

Advantageous Effects of Invention

With the inspection device according to the present invention, a dead spot of illumination light on an imaging object can be reduced and measurement accuracy can be improved.

BRIEF DESCRIPTION OF DRAWINGS

FIG. 1 is an explanatory diagram for describing a configuration of an inspection device.

FIGS. 2A and 2B are explanatory diagrams for describing a configuration of an illumination unit, in which FIG. 2A is a plan view from a side of a first image unit and FIG. 2B is a sectional view taken along A-A FIG. 2A.

FIG. 3 is an explanatory diagram showing an arrangement of the illumination unit, a first image unit, a second image unit, and a projection unit in an imaging unit.

FIGS. 5A and 5A are explanatory diagrams for describing a relationship between a projection angle of the illumination unit and detection of reflected light of the illumination unit, in which FIG. 5A shows a projection angle of each light source of the illumination unit and FIG. 5B shows an example of a state of an inspection surface of an inspection object.

DESCRIPTION OF EMBODIMENT

Figure 2A:
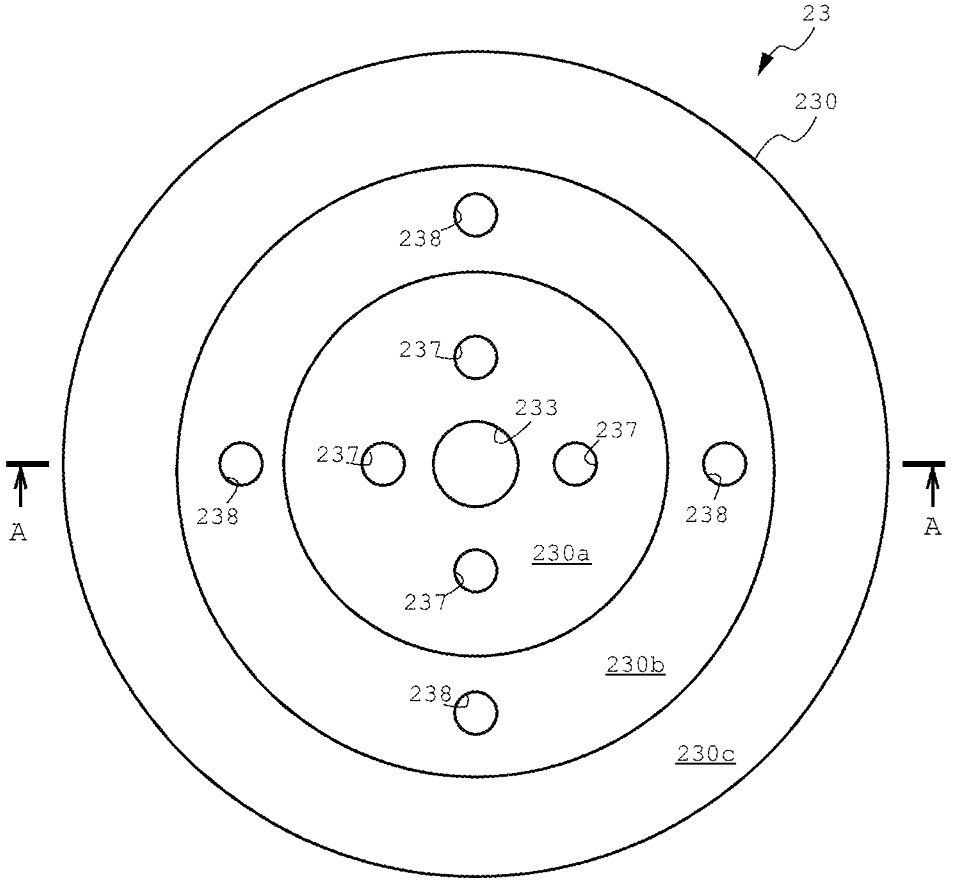

Hereinafter, a preferred embodiment of the present invention will be described with reference to the drawings. First, a configuration of an inspection device 10 according to the present embodiment will be described using FIG. 1. The inspection device 10 is an inspection device for inspecting an inspection object 12 using inspection object image data obtained by capturing an image of the inspection object 12. For example, the inspection object 12 is an electronic circuit board on which a large number of electronic components are mounted. The inspection device 10 specifies whether a mounting state of the electronic components is good or bad based on the inspection object image data. The inspection is usually performed on a plurality of inspection items for each component. An inspection item is an item that requires good/bad to be specified. For example, inspection items include inspection items with respect to component arrangement such as an absence, a misalignment, a reversal of polarity, and the like of a component itself and inspection items with respect to a connection between the component and a substrate such as a soldering condition and lifting of a lead pin of the component.

The inspection device 10 is configured to include an inspection table 14 for holding the inspection object 12, an imaging unit 20 that illuminates and captures an image of the inspection object 12, an XY stage 16 that moves the imaging unit 20 with respect to the inspection table 14, and a controlling unit 30 for controlling operations of the imaging unit 20 and the XY stage 16. For convenience of description, as shown in FIG. 1, an inspection object placement surface of the inspection table 14 is considered an XY plane and a direction perpendicular to the placement surface (in other words, an imaging direction by the imaging unit 20 (an imaging axis of a first image unit 21 (an optical axis direction of an optical system of the first image unit 21))) is considered a Z direction.

The imaging unit 20 is attached to a mobile table (not illustrated) of the XY stage 16 and is movable in each of an X direction and a Y direction by the XY stage 16. For example, the XY stage 16 is a so-called H-shaped XY stage. Therefore, the XY stage 16 is equipped with a Y drive unit that moves the mobile table in the Y direction along a Y-direction guide extending in the Y direction, and two X-direction guides and two X drive units configured to support the Y-direction guide at both ends thereof and enable the moving table and the Y-direction guide to move in the X direction. The XY stage 16 may be further equipped with a Z movement mechanism to move the imaging unit 20 in the Z direction or further equipped with a rotation mechanism to rotate the imaging unit 20. The inspection device 10 may be further equipped with an XY stage that enables the inspection table 14 to move, in which case the XY stage 16 that moves the imaging unit 20 may be omitted. In addition, a linear motor or a ball screw can be used as the X drive units and the Y drive unit.

The imaging unit 20 is configured to include the first image unit 21 being a main image unit that captures images of the inspection object 12 that is an imaging object from a vertical direction, a second image unit 22 being an inclined image unit that captures images of the inspection object 12 from a diagonal direction, an illumination unit 23 that illuminates the inspection object 12, and a projection unit 24 that projects pattern stripes for three-dimensional measurement onto the inspection object 12. In the inspection device 10 according to the present embodiment, the first image unit 21, the second image unit 22, the illumination unit 23, and the projection unit 24 are configured as an integrated imaging unit 20, and while relative positions of the first image unit 21, the second image unit 22, the illumination unit 23, and the projection unit 24 in the integrated imaging unit 20 are fixed, alternatively, each unit may be configured so as to be relatively movable. In addition, the first image unit 21, the second image unit 22, the illumination unit 23, and the projection unit 24 may be separate bodies and configured so as to be separately movable.

The first image unit 21 includes an image sensor that generates two-dimensional image data of the imaging object and an optical system (for example, a lens) for forming an image on the image sensor. The first image unit 21 is, for example, a CMOS camera or a CCD camera. A maximum visual field of the first image unit 21 may be smaller than an inspection object placement area of the inspection table 14. In this case, the first image unit 21 captures an entire image of the inspection object 12 by dividing the image into a plurality of partial images. The controlling unit 30 controls the XY stage 16 so that the first image unit 21 is moved to a next imaging position each time the first image unit 21 captures a partial image and outputs partial image data. The controlling unit 30 generates entire image data of the inspection object 12 by compositing pieces of partial image data.

Note that the first image unit 21 may be equipped with an image sensor that generates one-dimensional image data instead of a two-dimensional image sensor. In this case, by scanning the inspection object 12 with the first image unit 21, an overall image of the inspection object 12 can be acquired.

The illumination unit 23 is configured to project illumination light for imaging by the first image unit 21 and the second image unit 22 on a surface of the inspection object 12. The illumination unit 23 is equipped with one or a plurality of light sources that emit light of a wavelength or a wavelength range selected from wavelength range detectable by the image sensors of the first image unit 21 and the second image unit 22. The illumination light is not limited to visible light and ultraviolet light, X-rays, and the like may be used. When the light source is provided in plurality, each light source is configured to project light (for example, red, blue, or green) of a different wavelength on the surface of the inspection object 12 a different projection angle.

In the inspection device 10 according to the present embodiment, the illumination unit 23 is equipped with lateral illuminating sources (in the present embodiment, constituted of an upper light source 23*a*, a middle light source 23*b*, and a lower light source 23*c*) and a reflector plate 230 that reflects light emitted from the lateral illuminating sources 23*a* to 23*c* and projects illumination light from a diagonal direction on an inspection surface of the inspection object 12 (in other words, a surface (X-Y plane) facing the imaging unit 20) (details of the lateral illuminating sources 23*a* to 23*c* and the reflector plate 230 will be described later). In this case, in the inspection device 10 according to the present embodiment, each of the lateral illuminating sources 23*a*, 23*b*, and 23*c* is an annular light source (ring illuminating source) and is configured to surround the optical axis of the first image unit 21 and obliquely project illumination light on the inspection surface of the inspection object 12 using the reflector plate 230. Note that each of the upper light source 23*a*, the middle light source 23*b*, and the lower light source 23*c* that are lateral illuminating sources may be configured by having a plurality of light sources arranged in an annular shape. In addition, each of the upper light source 23*a*, the middle light source 23*b*, and the lower light source 23*c* is configured to project illumination light at a different angle with respect to the inspection surface via the reflector plate 230.

In addition, each of the upper light source 23*a*, the middle light source 23*b*, and the lower light source 23*c* that are lateral illuminating sources may be constituted of one ring illuminating source or may include a plurality of ring illuminating sources. For example, of the lateral illuminating sources, the upper light source 23*a* can be configured as one ring illumination unit and the middle light source 23*b* and the lower light source 23*c* can be configured as one integrated ring illuminating unit. Furthermore, of the lateral illuminating sources, the upper light source 23*a* and the lower light source 23*c* may be red illuminating sources and the middle light source 23*b* may be constituted of a green illuminating source, a blue illuminating source, and a red illuminating source. Moreover, the upper light source 23*a* and the lower light source 23*c* may be constituted of a green illuminating source or a blue illuminating source.

In this manner, while a case where three types of light sources (the lateral illuminating sources 23*a*, 23*b*, and 23*c*) that irradiate the inspection object 12 with illumination light from different angles are used will be described in the present embodiment, the types (number) of light sources are not limited to three and two or four or more light sources may be used. For example, in addition to the lateral illuminating sources 23*a*, 23*b*, and 23*c*, an epi-illuminating source that irradiates the inspection object 12 with illumination light along the optical axis of the first image unit 21 may be combined. Alternatively, only some of the lateral illuminating sources 23*a*, 23*b*, and 23*c* may be used. Alternatively, only one light source among the light sources 23*a* to 23*c* may be used, in which case a configuration to obtain a monochrome image with a monochromatic light source may be adopted.

In FIG. 1, for reference, a light flux emitted from the upper light source 23*a* among the lateral illuminating sources 23*a*, 23*b*, and 23*c*, reflected by the reflector plate 230 and projected on the inspection object 12, further reflected by the inspection surface of the inspection object 12, and incident to the first image unit 21 is indicated by dashed arrows. In addition, light emitted from the middle light source 23*b* and the lower light source 23*c* among the lateral illuminating sources and from the projection unit 24 and light incident to the second image unit 22 are similarly indicated by dashed arrows. In this case, while the surface of the inspection object 12 is illustrated as a flat surface for convenience of description, in reality, the surface has inclinations and heights depending on location, just like a general inspection object.

In addition, the second image unit 22 is configured to capture images of the inspection surface (substrate surface) of the inspection object 12 from a diagonal direction. For example, the second image unit 22 is also a CMOS camera or a CCD camera in a similar manner to the first image unit 21. While the second image unit 22 is provided between the middle light source 23*b* and the lower light source 23*c* in the illustrated example, the arrangement of the second image unit 22 is not limited thereto and, for example, the second image unit 22 may be provided outside the lower light source 23*c*.

Note that the second image unit 22 may be provided in plurality around the first image unit 21. The plurality of second image units 22 are arranged so as to capture images of the inspection object 12 from respectively different directions. Accordingly, an area that is blocked and prevents image thereof from being captured due to a height difference on the inspection surface can be reduced.

The projection unit 24 projects a pattern onto the inspection surface of the inspection object 12. An image of the inspection object 12 on which the pattern has been projected is captured by the first image unit 21. While the projection unit 24 is provided between the upper light source 23*a* and the middle light source 23*b* in the illustrated example, the arrangement of the projection unit 24 is not limited thereto and, for example, the projection unit 24 may be provided outside the lower light source 23*c*.

The inspection device 10 creates a height map of the inspection surface of the inspection object 12 based on pattern image data of the inspection object 12 captured in a state where the pattern has been projected from the projection unit 24. The controlling unit 30 detects local discrepancies in a pattern image relative to the projected pattern and determines the height of a location based on the local discrepancies. In other words, a change in a captured pattern (the pattern projected on the inspection object 12 and captured by the first image unit 21) relative to the projected pattern (the pattern projected from the projection unit 24 on the inspection object 12) corresponds to a change in height on the inspection surface.

In this case, the projected pattern is preferably a one-dimensional stripe pattern with alternating light and dark lines that are repeated periodically. The projection unit 24 is arranged so as to project a stripe pattern on the inspection surface of the inspection object 12 from a diagonal direction. A discontinuity in height on the inspection surface of the inspection object 12 is represented as a pattern shift in a stripe pattern image. Therefore, a height difference can be determined from an amount of shift of the pattern. In the inspection device 10 according to the present embodiment, the controlling unit 30 creates a height map by a PMP (Phase Measurement Profilometry) method which uses a stripe pattern whose brightness varies according to a sine curve. In the PMP method, the amount of shift of a stripe pattern corresponds to a phase difference of the sine curve.

The projection unit 24 is configured so as to include a pattern forming apparatus, a light source for illuminating the pattern forming apparatus, and an optical system for projecting a pattern on the inspection surface of the inspection object 12. For example, the pattern forming apparatus may be a variable patterning apparatus capable of dynamically generating a desired pattern such as a liquid crystal display or a fixed patterning apparatus in which a pattern is fixedly formed on a substrate such as a glass plate. When the pattern forming apparatus is a fixed patterning apparatus, a pattern projection position is preferably made variable by providing a moving mechanism to move the fixed patterning apparatus or by providing an adjustment mechanism in the optical system for pattern projection. In addition, the projection unit 24 may be configured to be capable of switching among a plurality of fixed patterning apparatuses with different patterns.

The projection unit 24 may be provided in plurality around the first image unit 21. The plurality of projection units 24 are arranged so as to project patterns on the inspection object 12 from respectively different projection directions. Accordingly, an area that becomes a shadow and a pattern is not projected thereon due to a height difference on the inspection surface can be reduced.

The controlling unit 30 shown in FIG. 1 comprehensively controls the entire present apparatus, and while the controlling unit 30 can be implemented by a CPU, memory, or other LSI of any computer as hardware or by a program loaded onto a memory as software, functional blocks that are realized by cooperation between such hardware and software are depicted here. Therefore, it is understood by those skilled in the art that the functional blocks can be realized in various ways by hardware alone, software alone, or a combination thereof.

FIG. 1 shows an example of a configuration of the controlling unit 30. The controlling unit 30 is configured to include an inspection control unit 31 and a memory 35 that is a storage unit. The inspection control unit 31 is configured to include a height measuring unit 32, an inspection data processing unit 33, and an inspecting unit 34. In addition, the inspection device 10 is equipped with an input unit 36 for receiving input from a user or another apparatus and an output unit 37 for outputting information related to an inspection, in which case the input unit 36 and the output unit 37 are respectively connected to the controlling unit 30. For example, the input unit 36 includes input means such as a mouse and a keyboard for receiving input from the user and communicating means for communicating with another apparatus. The output unit 37 includes known output means such as a display or a printer.

The inspection control unit 31 is configured to execute various kinds of control processing for inspection based on input from the input unit 36 and inspection-related information stored in the memory 35. The inspection-related information includes two-dimensional image data of the inspection object 12, a height map of the inspection object 12, and substrate inspection data (inspection data). Prior to an inspection, the inspection data processing unit 33 creates substrate inspection data using two-dimensional image data and a height map of an inspection object 12 that is guaranteed to pass all inspection items. The inspecting unit 34 executes the inspection based on the created substrate inspection data and the two-dimensional image data and the height map of the inspection object 12 to be inspected.

Substrate inspection data is inspection data that is created for each substrate variety. Substrate inspection data is, so to speak, a collection of inspection data for each component mounted on the substrate. The inspection data of each component includes inspection items required for that component, an inspection window that is an inspection area on an image for each inspection item, and inspection criteria for specifying whether each inspection item is good or bad. One or a plurality of inspection windows are set with respect to each inspection item. For example, in an inspection item of specifying whether soldering of a component is good or bad, usually, the same number of inspection windows as the number of soldering areas of the component are set in an arrangement corresponding to the arrangement of soldering areas. In addition, with respect to an inspection item that uses image data obtained by subjecting inspection object image data to predetermined image processing, contents of the image processing are also included in the inspection data.

The inspection data processing unit 33 sets each item of inspection data according to the substrate as substrate inspection data creation processing. For example, the inspection data processing unit 33 automatically sets a position and a size of each inspection window for each inspection item so as to conform to a component layout of the substrate. The inspection data processing unit 33 may receive input by the user with respect to a part of the items in inspection data. For example, the inspection data processing unit 33 may accept tuning of inspection criteria by the user. The inspection criteria may be set using height information.

The inspection control unit 31 executes imaging processing of the inspection object 12 as preprocessing of creation of substrate inspection data. As the inspection object 12, an inspection object having passed all inspection items is used. As described above, imaging processing is performed by controlling relative movement of the imaging unit 20 and the inspection table 14 while illuminating the inspection object 12 with the illumination unit 23, sequentially capturing partial images of the inspection object 12 with the first image unit 21 and the second image unit 22, and acquiring partial image data. A plurality of pieces of partial image data are captured so as to cover the entire inspection object 12. The inspection control unit 31 composites the plurality of pieces of partial image data and generates full substrate image data including the entire inspection surface of the inspection object 12. The inspection control unit 31 stores the full substrate image data in the memory 35.

In addition, as preprocessing for creating a height map, the inspection control unit 31 controls relative movement of the imaging unit 20 and the inspection table 14 while projecting a pattern on the inspection object 12 with the projection unit 24 and acquires divided image data when the first image unit 21 divides and sequentially captures pattern images of the inspection object 12 and projects the pattern. Preferably, the projected pattern is a stripe pattern whose brightness changes according to a sine curve based on the PMP method. The inspection control unit 31 composites the pieces of divided image data obtained by imaging and generates pattern image data that is image data of the entire inspection surface of the inspection object 12. The inspection control unit 31 stores the pattern image data in the memory 35. Alternatively, pattern image data may be generated with respect to a part of the inspection surface instead of the entire inspection surface.

The height measuring unit 32 creates a height map of the entire inspection surface of the inspection object 12 based on a captured pattern of the pattern image data. First, the height measuring unit 32 obtains a phase difference map of the inspection surface of the inspection object 12 by obtaining a local phase difference between the pattern image data and reference pattern image data for the entire image. The reference pattern image data is a pattern image projected by the projection unit 24 (in other words, image data generated by the pattern forming apparatus built into the projection unit 24). The height measuring unit 32 creates a height map of the inspection object 12 based on a reference plane to be a reference for height measurement and the phase difference map. For example, the reference plane is a substrate surface of the electronic circuit board to be inspected. The reference plane need not necessarily be a flat surface and may be a curved surface on which a deformation such as warpage of the substrate is reflected. The reference plane may be designated in advance by an input by the user or the like or, for example, obtained for each substrate by a substrate surface height measurement method to be described later.

Specifically, the height measuring unit 32 obtains a phase difference of a stripe pattern from each pixel of captured pattern image data and a pixel of reference pattern image data corresponding to the pixel. The height measuring unit 32 converts the phase difference into a height. The conversion to height is done using a local stripe width in the vicinity of the pixel in question. This is done to interpolate the stripe width on the captured pattern image data, which varies from one place to another. This is because, due to a distance from the projection unit 24 varying depending on a position on the inspection surface, the stripe width changes linearly from one end to another of a pattern projection area on the inspection surface even if the stripe width of the reference pattern is constant. The height measuring unit 32 determines a height from the reference plane based on the height obtained through the conversion and the reference plane and creates a height map of the inspection object 12.

The inspection control unit 31 may create inspection object image data having a height distribution by associating height information included in the height map of the inspection object 12 with each pixel of a two-dimensional image of the inspection object 12. In addition, the inspection control unit 31 may perform three-dimensional modeling display of the inspection object 12 based on the inspection object image data with a height distribution. Furthermore, the inspection control unit 31 may superimpose the height distribution on two-dimensional inspection object image data and display the resulting image data on the output unit 37. For example, the inspection object image data may be color-coded and displayed according to the height distribution. In the inspection device 10 according to the present embodiment, the projection unit 24 and the height measurement processing of the inspection object 12 by the projection unit 24 need not be implemented.

An illumination method of the inspection object 12 by the illumination unit 23 of the imaging unit 20 when acquiring image data of the inspection object 12 with the first image unit 21 and the second image unit 22 in the inspection device 10 according to the present embodiment will now be described.

Figure 2B:
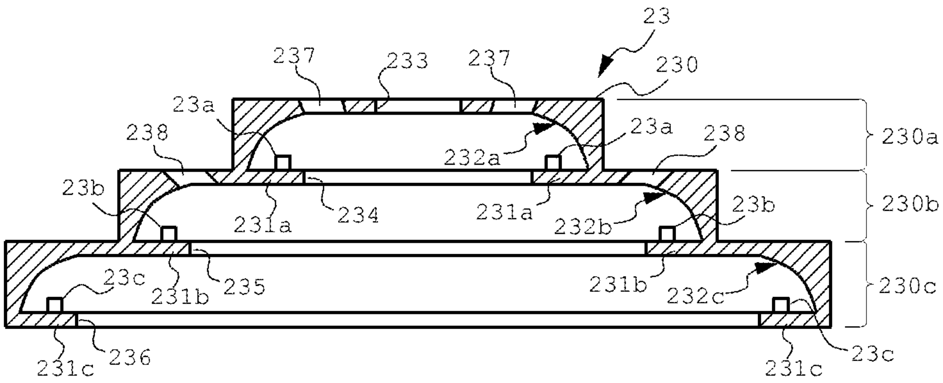

As shown in FIGS. 2A, 2B and 3, the illumination unit 23 of the imaging unit 20 includes the lateral illuminating sources (the upper light source 23*a*, the middle light source 23*b*, and the lower light source 23*c*) and the dome-shaped reflector plate 230 arranged between the first image unit 21 and the inspection object 12. The reflector plate 230 has aperture parts 233 and 236 formed on a side of the first image unit 21 and a side of the inspection object 12, respectively.

More specifically, the reflector plate 230 is configured by being divided into three portions in order from the side of the first image unit 21: an upper reflector plate 230*a*, a middle reflector plate 230*b*, and a lower reflector plate 230*c*, each of which is dome-shaped and connected to each other by aperture parts 234 and 235. Note that in the following description, the upper reflector plate 230*a*, the middle reflector plate 230*b*, and the lower reflector plate 230*c* that constitute the reflector plate 230 will also be referred to as divided parts.

The upper reflector plate 230*a* has the aperture part 233 formed on the side of the first image unit 21 and an inward-extending annular protrusion 231*a* formed at an end on the side of the inspection object 12, and an inner circumference of the protrusion 231*a* forms the aperture part 234. An inner circumferential surface 232*a* of the upper reflector plate 230*a* is made a reflective surface that reflects light and the upper light source 23*a* is arranged on the side of the first image unit 21 of the protrusion 231*a*. Therefore, light radiated from the upper light source 23*a* illuminates the inner circumferential surface 232*a* of the upper reflector plate 230*a*, the light is further reflected by the inner circumferential surface 232*a*, passes through the aperture part 234, and reaches the inspection object 12 for irradiation therewith.

The middle reflector plate 230*b* has the aperture part 234 formed on the side of the first image unit 21 and an inward-extending annular protrusion 231*b* formed at an end on the side of the inspection object 12, and an inner circumference of the protrusion 231*b* forms the aperture part 235. An inner circumferential surface 232*b* of the middle reflector plate 230*b* is made a reflective surface that reflects light. A surface on the side of the inspection object 12 of the protrusion 231*a* of the upper reflector plate 230*a* also forms a part of the inner circumferential surface 232*b* of the middle reflector plate 230*b* and is made a reflective surface. In addition, the middle light source 23*b* is arranged on the side of the first image unit 21 of the protrusion 231*b* of the middle reflector plate 230*b*. Therefore, light radiated from the middle light source 23*b* illuminates the inner circumferential surface 232*b* of the middle reflector plate 230*b*, the light is further reflected by the inner circumferential surface 232*b*, passes through the aperture part 235, and reaches the inspection object 12 for irradiation therewith.

The lower reflector plate 230*c* has the aperture part 235 formed on the side of the first image unit 21 and an inward-extending annular protrusion 231*c* formed at an end on the side of the inspection object 12, and an inner circumference of the protrusion 231*c* forms the aperture part 236. An inner circumferential surface 232*c* of the lower reflector plate 230*c* is made a reflective surface that reflects light. A surface on the side of the inspection object 12 of the protrusion 231*b* of the middle reflector plate 230*b* also forms a part of the inner circumferential surface 232*c* of the lower reflector plate 230*c* and is made a reflective surface. In addition, the lower light source 23*c* is arranged on the side of the first image unit 21 of the protrusion 231*c* of the lower reflector plate 230*c*. Therefore, light radiated from the lower light source 23*c* illuminates the inner circumferential surface 232*c* of the lower reflector plate 230*c*, the light is further reflected by the inner circumferential surface 232*c*, passes through the aperture part 236, and reaches the inspection object 12 for irradiation therewith.

Note that FIG. 3 is a diagram for describing the relationship between the lateral illuminating sources 23*a* to 23*c* and the reflector plate 230 in the illumination unit 23 and the relationship between the illumination unit 23 and the first image unit 21, the second image unit 22, and the projection unit 24. Therefore, with an actual product, for example, the illumination unit 23 may be manufactured by preparing the upper reflector plate 230*a*, the middle reflector plate 230*b*, and the lower reflector plate 230*c* and a light source unit on which each of the lateral illuminating sources 23*a* to 23*c* is mounted as separate bodies and subsequently assembling the separate bodies.

As described above, in the illumination unit 23 of the imaging unit 20 in the inspection device 10 according to the present embodiment, the upper reflector plate 230*a*, the middle reflector plate 230*b*, and the lower reflector plate 230*c* are connected by bringing the aperture parts 234 and 235 into contact in the vertical direction. In other words, since the aperture part on the side of the inspection object 12 of the upper reflector plate 230*a* and the aperture part on the side of the first image unit 21 of the middle reflector plate 230*b* are the aperture part 234, the radii of the aperture parts are the same dimension. In addition, since the aperture part on the side of the inspection object 12 of the middle reflector plate 230*b* and the aperture part on the side of the first image unit 21 of the lower reflector plate 230*c* are the aperture part 235, the radii of the aperture parts are the same dimension.

The upper reflector plate 230*a* has through-holes 237 arranged in an annular array spaced apart from each other so as to surround the aperture part 233. The projection unit 24 that is an apparatus for inspection is arranged in an annular array outside of the upper reflector plate 230*a* so that an optical axis of the projection unit 24 passes through each of the through-holes 237. Note that although a case where four through-holes 237 arrayed so as to opposite each other across the aperture part 233 in the X direction and the Y direction or, in other words, arrayed at 90°-intervals are formed and four projection units 24 are arrayed with respect to the respective through-holes 237 is shown here, the through-holes 237 and the projection units 24 are not limited to four sets and, for example, may be constituted of three sets of the through-holes 237 and the projection units 24 arrayed spaced apart from each other at 120°-intervals or may be constituted of five or more sets of the through-holes 237 and the projection units 24.

The middle reflector plate 230*b* has through-holes 238 arranged in an annular array spaced apart from each other so as to surround the upper reflector plate 230*a*. In addition, the second image unit 22 that is an apparatus for inspection is arranged in an annular array outside of the middle reflector plate 230*b* so that an optical axis of the second image unit 22 passes through the through-holes 238. Note that although a case where four through-holes 238 arrayed so as to opposite each other across the upper reflector plate 230*a* in the X direction and the Y direction or, in other words, arrayed at 90°-intervals are formed and four second image units 22 are arrayed with respect to the respective through-holes 238 is shown here, the through-holes 238 and the second image units 22 are not limited to four sets and, for example, may be constituted of three sets of the through-holes 238 and the second image units 22 arrayed spaced apart from each other at 120°-intervals or may be constituted of five or more sets of the through-holes 238 and the second image units 22.

Note that a through-hole may be provided in the lower reflector plate 230*c* and an apparatus for inspection may be arrayed so that an optical axis of the apparatus for inspection passes through the through-hole. In this case, as the apparatus for inspection, a specific-wavelength irradiation unit that irradiates the inspection object 12 with illumination light of a specific wavelength can be arranged in addition to the second image unit 22 that is an inclined image unit and the projection unit 24 described above.

As described above, by providing the reflector plate 230 with the through-holes 237 and 238 and arranging an apparatus for inspection so that an optical axis thereof passes through the through-holes 237 and 238, as shown in FIG. 3, the inspection object 12 can be irradiated with pattern stripes or illumination light of specific wavelengths or images of the inspection object 12 can be captured at different angles with respect to the imaging axis of the first image unit 21 that is a main image unit. In addition, the apparatus for inspection may be configured so that the closer the arranged reflector plate 230 is to the side of the imaging object (in the order of the upper reflector plate 230*a*, the middle reflector plate 230*b*, and the lower reflector plate 230*c*), the greater an angle formed between the imaging axis of the first image unit 21 that is a main image unit and the optical axis of the apparatus for inspection. Note that when the second image unit 22 that is an inclined image unit and the projection unit 24 are arranged as apparatuses for inspection on the reflector plate 230, the projection unit 24 is desirably arranged closer to the first image unit 21 that is a main image unit than the second image unit 22. Bringing a projection angle of the projection unit 24 closer to the optical axis of the first image unit 21 that is a main image unit enables portions that become shadows on the inspection object 12 to be reduced. This is particularly effective when a distance between adjacent pitches as in chip components is small.

In addition, the light sources (the upper light source 23*a*, the middle light source 23*b*, and the lower light source 23*c*) provided in the illumination unit 23 are desirably configured so that a turn-on timing and an emitted color can be controlled for each light source by the controlling unit 30.

Furthermore, although the light sources (the upper light source 23*a*, the middle light source 23*b*, and the lower light source 23*c*) provided in the illumination unit 23 are annular light sources (ring light sources), the light sources can be divided into a plurality of portions (for example, into four portions), and in this configuration, the controlling unit 30 can desirably control the turning on and turning off of each portion (segmented lighting is possible). According to this configuration, in each of the light sources (the upper light source 23*a*, the middle light source 23*b*, and the lower light source 23*c*), the inspection object 12 can be illuminated from all azimuths from 0° to 360° by turning on all portions and the inspection object 12 can be illuminated from a specific azimuth by turning on a part of the portions (turning off the remaining portions). In this case, all of the upper light source 23*a*, the middle light source 23*b*, and the lower light source 23*c* may be configured so as to enable segmented lighting or any one or two of the light sources may be configured so as to enable segmented lighting.

As described above, since the inspection device 10 according to the present embodiment can bring apparatuses for inspection (the second image unit 22 and the projection unit 24) attached in a diagonal direction closer to the inspection object 12 that is an imaging object as compared to conventional configurations of directly irradiating the inspection object 12 with light from a light source by reflecting illumination light from the light sources 23*a* to 23*c* with the dome-shaped reflector plate 230 and irradiating the inspection object 12 with the reflected light, the resolution of a camera and height reproducibility due to stripe refinement can be improved, and as a result, inspection accuracy can be improved.

In addition, since using the dome-shaped reflector plate 230 eliminates the need to use a diffuser plate to diffuse illumination light from the light sources 23*a* to 23*c*, loss of amount of light can be reduced.

Furthermore, in FIG. 3, dashed-two dotted lines indicate optical axes (imaging axes) of the first image unit 21, the second image unit 22, and the projection unit 24. In addition, dashed lines indicate light fluxes of illumination light that are emitted from each of the upper light source 23*a*, the middle light source 23*b*, and the lower light source 23*c*, reflected by each of the upper reflector plate 230*a*, the middle reflector plate 230*b*, and the lower reflector plate 230*c*, and reaches the inspection object 12 for irradiation therewith. As is apparent from FIG. 3, in the inner circumferential surfaces 232*a* to 232*c* of the upper reflector plate 230*a*, the middle reflector plate 230*b*, and the lower reflector plate 230*c*, since surfaces on the side of the inspection object 12 of the protrusions 231*a* and 231*b* are also reflective surfaces, there is hardly a gap between a light flux LFa of the illumination light radiated from the upper reflector plate 230*a* to the inspection object 12 and a light flux LFb of the illumination light radiated from the middle reflector plate 230*b* to the inspection object 12 and there is hardly a gap between the light flux LFb of the illumination light radiated from the middle reflector plate 230*b* to the inspection object 12 and a light flux LFc of the illumination light radiated from the lower reflector plate 230*c* to the inspection object 12. Therefore, an area not irradiated with the illumination light (the "dead spot" described earlier) on the inspection object 12 can be eliminated and measurement accuracy due to image data of the inspection object 12 captured in this state can be improved.

In addition, as described above, the illumination unit 23 of the inspection device 10 according to the present embodiment causes illumination light emitted from the light sources 23*a* to 23*c* to be reflected by the reflector plate 230 and irradiates the inspection object 12 with reflective light instead of directly irradiating the inspection object 12 with the illumination light emitted from the light sources 23*a* to 23*c*. While capturing images of the inspection object 12 in a state where the inspection object 12 is directly irradiated with the illumination light emitted from the light sources 23*a* to 23*c* increases variability in brightness in the captured image data, radiating the light after being reflected by the reflector plate 230 enables variability in brightness in the image data to be suppressed and improves measurement accuracy according to the image data.

Furthermore, as described above, apparatuses for inspection such as the first image unit 21, the second image unit 22, and the projection unit 24 are arranged so that optical axes of the apparatuses for inspection pass through the aperture part 233 and the through-holes 237 and 238 formed in the reflector plate 230. Since the reflector plate 230 can be given a thin structure, the sizes of the aperture part 233 and the through-holes 237 and 238 can be reduced and, as a result, a reflective surface in the inner circumferential surface of the reflector plate 230 can be increased and an area (dead spot) not irradiated with the illumination light on the inspection object 12 can be reduced.

Figure 4A:
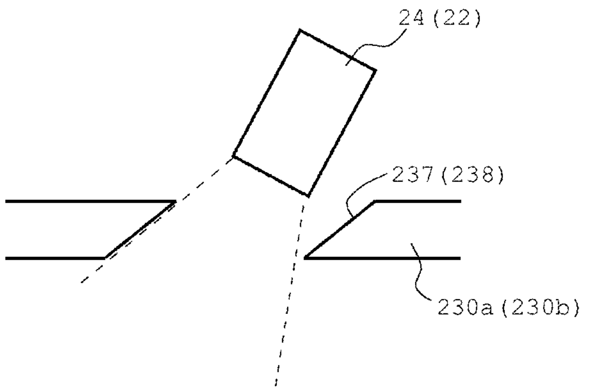
FIGS. 4A and 4B are explanatory diagrams for describing a relationship between an apparatus for inspection and a through-hole.
Figure 4B:
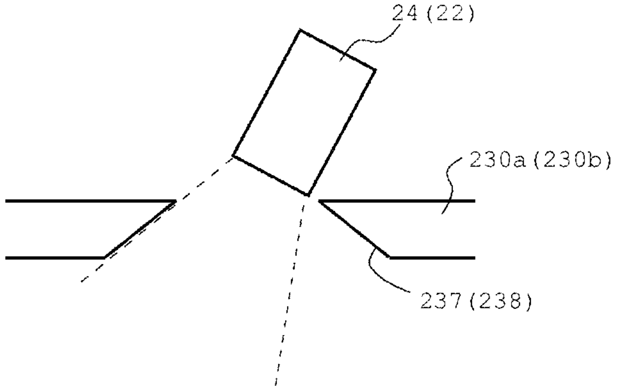

Note that since a field of view or an illumination field of each apparatus for inspection widens as moving away from the apparatus for inspection, the inner circumferential surfaces of the through-holes 237 and 238 along the field of view the illumination field are desirably configured to have a tapered shape at the reflector plate 230. For example, as shown in FIG. 4A, the inner circumferential surfaces of the through-holes 237 and 238 may have a tapered shape along the optical axes of the apparatuses for inspection 22 and 24 so that the inner circumferential surfaces become approximately parallel to the optical axes or, as shown in FIG. 4B, the inner circumferential surfaces of the through-holes 237 and 238 may have a tapered shape that widens from the side of the apparatuses for inspection 22 and 24 toward the side of the inspection object 12. Giving the through-holes 237 and 238 such a tapered shape enables the sizes of the through-holes 237 and 238 to be reduced and an area (dead spot) not irradiated with the illumination light on the inspection object 12 to be reduced.

In addition, while a case where the light source of the illumination unit 23 is constituted of the upper light source 23*a*, the middle light source 23*b*, and the lower light source 23*c* and the respective light sources are arranged on the upper reflector plate 230*a*, the middle reflector plate 230*b*, and the lower reflector plate 230*c* that are divided parts of the reflector plate 230 has been described above, the light sources and the divided parts of the reflector plate are not limited to three sets and may be constituted of two or four or more sets.

Finally, a processing method of image data captured using the illumination unit 23 will be described. As described above, as shown in FIG. 5A, in the inspection device 10 according to the present embodiment, the light sources (the upper light source 23*a*, the middle light source 23*b*, and the lower light source 23*c*) that constitute the illumination unit 23 are arranged so as to be diagonal with respect to the optical axis (imaging axis) L of the first image unit 21 and to have different projection angles with respect to a reference plane of the inspection object 12 (the inspection surface of the inspection object 12 and a plane approximately parallel to an installation surface of the inspection device 10). Specifically, illumination light is projected so that the projection angles approach a horizontal direction in an order of the upper light source 23*a*, the middle light source 23*b*, and the lower light source 23*c*.

Of the light emitted from each of the light sources 23*a* to 23*c* of the illumination unit 23, reflected by each of the divided parts 230*a* to 230*c* of the reflector plate 230 and radiated to the inspection object 12, and reflected by the inspection object 12, intensity of light other than the light reflected by the inspection object 12 and directly incident to the first image unit 21 changes depending on a state of the measured object but is ideally zero, for example, in a case of a configuration of which reflectance is close to 100%. In other words, an angle (inclined state) of the inspection surface of the inspection object 12 with respect to the reference plane and the intensity of reflected light by a light source that projects light to be reflected by the inspection surface and directly incident to the first image unit 21 among light emitted by the respective light sources 23*a* to 23*c* of the illumination unit 23 increases while intensity of reflected light by other light sources becomes zero. For example, when solder with a cross section shown in FIG. 5B is formed on the inspection surface of the inspection object 12, the intensity of reflected light of the illumination light by each of the light sources 23*a* to 23*c* of the illumination unit 23 as detected by the image sensor of the first image unit 21 changes according to an angle of a surface of the solder with respect to the reference plane.

Figure 5A:
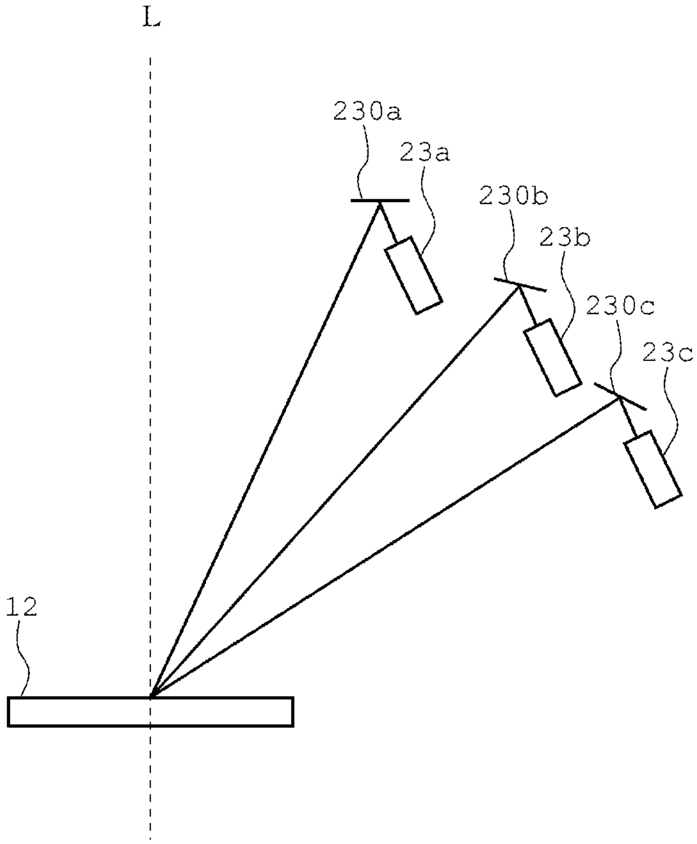
Figure 5B:
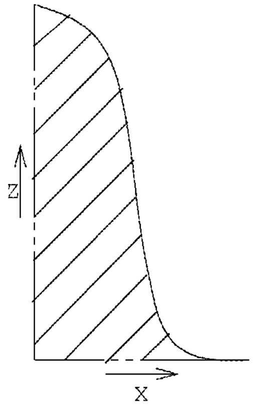

Therefore, in the case of FIG. 5A, as intensity of light detected by the first image unit 21, light from the upper light source 23*a* is strong with respect to inclined surfaces that are close to the reference plane, and as the inclination of the inclined surface from the reference plane increases, intensity of detected light changes in the order of the middle light source 23*b* and the lower light source 23*c*. As a result, by determining which light source has the stronger light intensity in the image data captured by the first image unit 21, an angle of the inclined surface at a location where the light was reflected on the inspection object 12 can be estimated.

An angle of an inclined surface (for example, an angle of a solder surface) of the inspection object 12 that is estimated from image data captured by the first image unit 21 by illumination due to the illumination unit 23 (the light sources 23*a* to 23*c* and the divided parts 230*a* to 230*c* of the reflector plate 230) can be determined based on a central angle and an illumination range of the illumination. However, changes in an illumination angle depending on the position in the field of view (FOV) of the first image unit 21, setting values of the first image unit 21, and the like must also be considered.

Note that the relationship between each of the light sources 23*a* to 23*c* of the illumination unit 23 and an angle of an inclined surface of the inspection object 12 is simply an example and is not limited to this configuration. For example, providing four or more light sources (providing four or more sets of light sources and divided parts of the reflector plate) narrows an illumination range for each light source, and the more light sources there are, the greater the resolution when estimating the angle of the inclined surface of the inspection object 12 (for example, an angle of a solder surface) from the captured image data. In addition, in a case where the inspection object 12 is an object to be inspected with high reflectance such as a metal sphere, measurements cannot be performed within a range of 0° to 90°.

From the above, the intensity of each pixel in image data obtained by turning on each of the light sources 23*a* to 23*c* of the illumination unit 23 and capturing images with the first image unit 21 becomes larger when the angle of the inclined surface is consistent with the angle described above but has a value close to zero when it is not. The same is true for image data captured by the second image unit 22 of which the optical axis is positioned at an angle different from that of the first image unit 21, and a range of angles different from the range of angles of the inclined surface that can be estimated from the image data captured by the first image unit 21 can also be estimated. Therefore, in the inspection device 10 according to the present embodiment, a configuration is adopted in which, from image data obtained by causing the reflector plate 230 (divided parts 230*a* to 230*c*) to reflect light from each of the light sources 23*a* to 23*c* of the illumination unit 23, projecting the light on the inspection object 12, and capturing the light with the first image unit 21 and the second image unit 22, an angle of the inclined surface of the inspection object 12 (for example, an angle of solder) is estimated based on the intensity of light for each pixel.

In addition, the light sources 23*a* to 23*c* may be turned on sequentially in order to capture images of the inspection object 12 with the first image unit 21 and the second image unit 22, or the first image unit 21 and the second image unit 22 may be constituted of a camera capable of acquiring color image data and the light sources 23*a* to 23*c* may be turned on simultaneously in different colors to capture images of the inspection object 12 at one time. In this case, image data corresponding to each of the light sources 23*a* to 23*c* can be acquired from one piece of color image data by acquiring image data of an R (red) component, image data of a G (green) component, and image data of a B (blue) component.

Furthermore, an object to be inspected for estimating an angle of an inclined surface of the inspection object 12 according to such image data captured by the first image unit 21 and the second image unit 22 is not limited to the solder surface described above and can also be applied to a shape of an IC lead tip or a shape of a chip electrode.

The invention claimed is:

1. An inspection device, comprising:

a main image unit that captures an image of an imaging object from a vertical direction;

a plurality of dome-shaped reflector plates being arranged between the main image unit and the imaging object and having aperture parts on a side of the main image unit and a side of the imaging object, respectively;

a plurality of annular light sources that illuminate the respective reflector plates; and apparatuses for inspection that are provided outside of the reflector plates and are capable of capturing an image of the imaging object or irradiating the imaging object with light, wherein optical axes of the apparatuses for inspection are arranged so as to pass through through-holes provided in the reflector plates.

2. The inspection device according to claim 1, wherein the plurality of reflector plates are connected by bringing the aperture parts into contact in the vertical direction, and a radius of the aperture part on the side of the imaging object of the reflector plate on the side of the main image unit and a radius of the aperture part on the side of the main image unit of the reflector plate on the side of the imaging object are the same dimension.

3. The inspection device according to claim 1, wherein a turn-on timing and an emitted color can be controlled for each light source of the plurality of light sources.

4. The inspection device according to claim 1, wherein the apparatuses for inspection include at least any of an inclined image unit that captures images of the imaging object from a diagonal direction, a projection unit capable of projecting pattern stripes for three-dimensional measurement, and a specific-wavelength irradiation unit that radiates illumination light of a specific wavelength.

5. The inspection device according to claim 1, wherein the apparatuses for inspection are arranged in an annular array spaced apart from each other on the reflector plate.

6. The inspection device according to claim 1, wherein the apparatuses for inspection are configured so that the closer the arranged reflector plates are to a side of the imaging object, the greater an angle formed between an imaging axis of the main image unit and the optical axes of the apparatuses for inspection.

7. The inspection device according to claim 1, wherein the through-holes have a tapered shape on the reflector plates.

8. The inspection device according to claim 1, wherein the through-holes are arranged in an annular array spaced apart from each other on the reflector plate.

9. The inspection device according to claim 1, wherein at least one of the plurality of light sources is divided into a plurality of portions for the respective light source and turning-on and turning-off can be controlled for each portion.

* * * * *